July 2, 1935.  W. I. CLEMENTS  2,007,075
AUXILIARY SEAT
Filed March 10, 1932   2 Sheets-Sheet 1
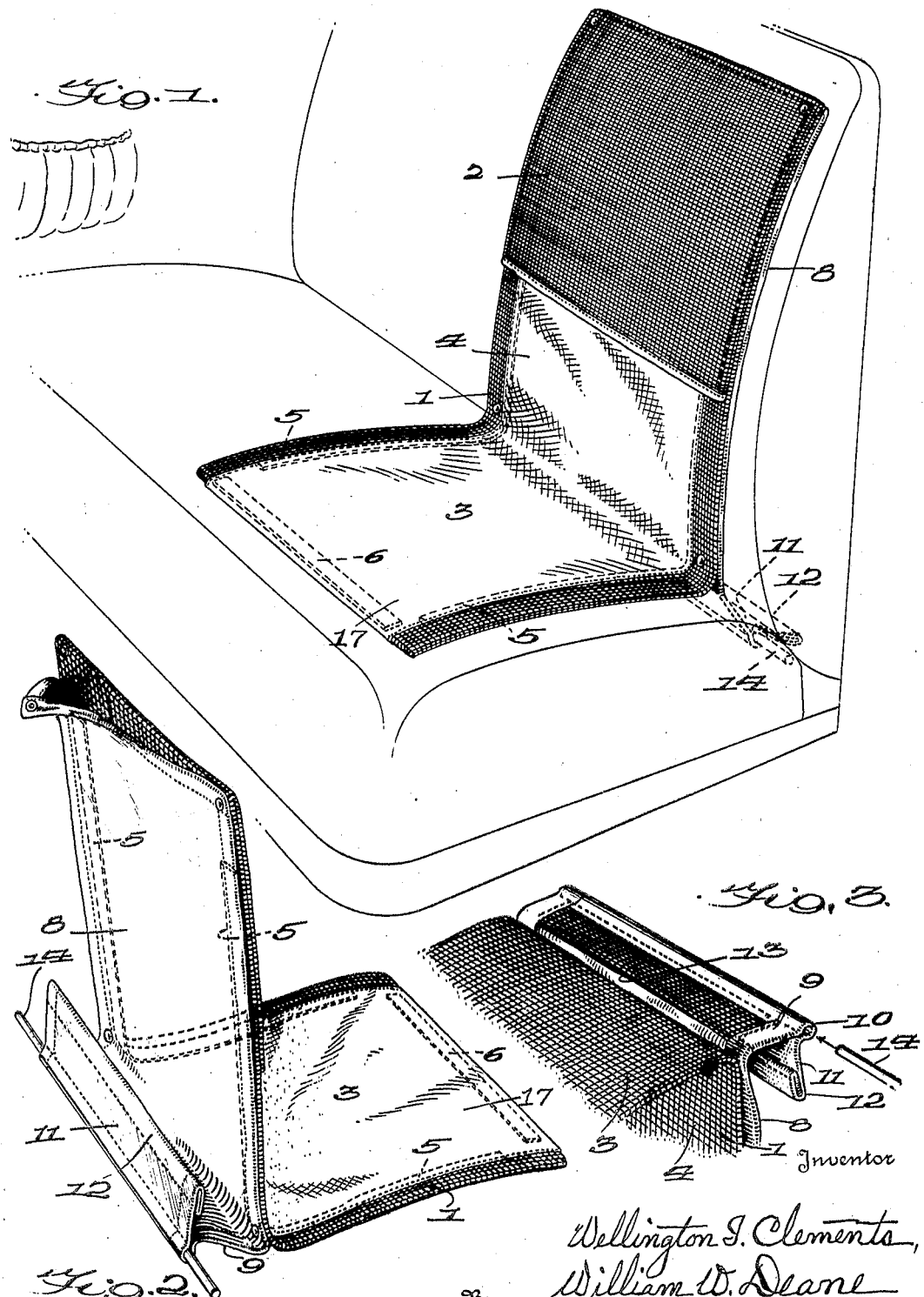

July 2, 1935.  W. I. CLEMENTS  2,007,075
AUXILIARY SEAT
Filed March 10, 1932   2 Sheets-Sheet 2
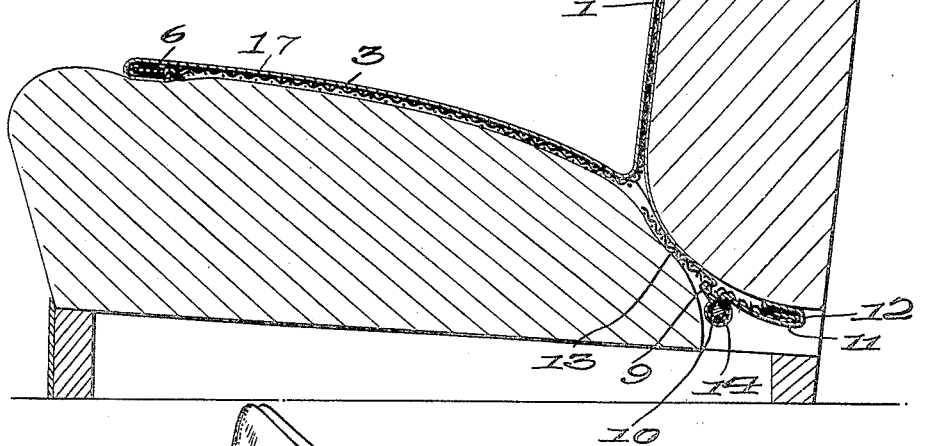

Patented July 2, 1935

2,007,075

UNITED STATES PATENT OFFICE 2,007,075

AUXILIARY SEAT

Wellington I. Clements, Norfolk, Va.

Application March 10, 1932, Serial No. 598,026

2 Claims. (Cl. 155—182)

This invention is directed to an improvement in auxiliary seats, designed for use in connection with automobile or other seats, and serving when in use as a protective covering for the seat proper, with the additional important advantageous properties of easing the position of the user, avoiding transference of vehicle vibrations to the user, facilitating the ventilation between the seat back and the user, providing for simplicity in application and retention when applied against casual displacement, and providing a secret storage space for valuables.

An essential feature of the present invention is the provision of an auxiliary seat presenting a combined seat and back having resilient elements for elastically retaining the proper relation between the seat and back, with an extended portion of the back folded down on the face of the normal back, with the lower edge of such down turned portion free of connection, to thereby form an upwardly opening pocket for the temporary reception of cushioning devices, thus enabling the user to sit more nearly upright with his back properly supported. The pocket also provides for the reception of skeleton frames to insure a comparatively large air space between the back of the user and the seat back for adequate ventilation with complete support.

Another important feature of the invention is the provision of a rear section for the back of the auxiliary seat, with such rear section overlying the seams of the seat back to protect the material of the vehicle seat against wear, the rear section being of such highly smoothed surface in that portion bearing on the vehicle seat as to permit comparatively perfect slippage between the auxiliary seat back and the vehicle seat, with the result that the vibrations of the vehicle are not transmitted to the back of the user to any considerable extent.

A further important feature is the provision of means for securing the auxiliary seat in place through use of an extension which may be effectively clamped between the meeting surfaces of the back and seat portions of the vehicle seat, the holding extension being further provided with a section to form a pocket, which when the auxiliary seat is in place is completely concealed.

The invention is illustrated in the accompanying drawings, in which:—

Fig. 1 is a perspective view showing the auxiliary seat in place.

Fig. 2 is a perspective view of the auxiliary seat detached.

Fig. 3 is a broken bottom perspective view of the same.

Fig. 4 is a vertical sectional view through the auxiliary seat and vehicle seat, the auxiliary seat being in applied position.

Fig. 5 is a transverse sectional view of the seat proper of the auxiliary seat.

Fig. 6 is a transverse sectional view of the back proper of the auxiliary seat.

Fig. 7 is a perspective view on a reduced scale of a modified form.

Fig. 8 is a side elevation of the same.

The auxiliary seat is made up of a section of appropriate length and width of open mesh material, as at 1, the length of such material being preferably such as to provide for an extension 2, to be later referred to. The material is substantially held in position to provide a seat section 3 and a back 4, being thus shaped through thin metallic spring strips arranged adjacent the side edges of the seat 3 and back 4, these strips, indicated at 5, being held in edge pockets or folds of the material, and being initially shaped to hold the parts in substantially desired form, though resiliently permitting relative movement of the parts when necessary.

The upper free edge of the back 4 and the forward free edge of the seat are preferably held against collapse by transverse spring strips 6, which are held in edge pockets of the material and extend to but avoid contact with the side strips 5. The extension 2, which is a length of the main material projecting above the upper edge of the back 4, is turned downwardly over the face of the back, being secured to the back at the side edges, but left free at its lower edge, as clearly shown in Fig. 4. This provides an upwardly opening pocket 7, designed for the reception of a pillow or other cushion to form an outstanding support for the back of the user to permit him to assume a more nearly upright position. This permits the user to slide forward on the seat and lessen the pressure at the lower part of his back. This pocket may also receive a skeleton frame of any conventional design which will convert the pocket into a comparatively large air space for better ventilation. In any event, the pocket section, with or without any device therein, adds materially to the ventilating effect, owing to the porous nature of the material.

A back section 8 is secured at its upper end to the upper edge of the back proper, the lower edge portion of the back section 8 being also secured to the lower edge of the back proper. The side edges of the back section are wholly free of any connection with the back, and thus present sides, preferably inturned, which overlie the seams in the back section, and prevent these seams having a wearing tendency on the material of the automobile seat. This back section is designed to rest between the back 4 and the back of the vehicle seat, and that surface next the back of the vehicle seat is extremely smooth, with a view to eliminating any material friction between the back of the auxiliary seat and the back of the vehicle seat. This tends to a more convenient self and compensating slippage of the back section 8 on the vehicle seat back, for easier adjustment of the user's position and avoidance of undue wear of the vehicle seat back material.

The back section 8 extends below the junction with the lower edge of the back 4 to provide an anchoring member 9, by which the auxiliary seat is held in applied position against casual displacement. This anchoring section is formed intermediate its length with a transverse tubular formation 10, and extended beyond such tubular formation as a flap 11, the free edge of which is thickened, as at 12, preferably by infolding the material. The bottom portion of the anchoring section 9 between the lower edge of the back 4 and the tubular formation 10 is provided with a strip of appropriate material, secured in place except for the edge next the back 4. As the anchoring member is entirely concealed when the auxiliary seat is in place, this additional strip provides a secret pocket, indicated at 13.

In applying the auxiliary seat, the seat 3 and back 4 are arranged against the respective parts of the vehicle seat and the anchoring member 9 is formed between the vehicle seat and back. The flap 11 is extended rearwardly during this placement, and owing to its extension and thickened terminal, such flap affords an additional holding means for preventing casual displacement of the auxiliary seat. If desired and as preferred a rod 14 of wood may be passed through the tubular formation 10, the rod extending in both directions beyond such tubular formation and serving through the grip of the vehicle seat and back to prevent lateral slippage of the auxiliary seat. The rod may extend into contact with the vehicle seat framing at one side to positively prevent movement of the auxiliary seat in one direction.

If desired, and as indicated in Figs. 7 and 8, an additional back section 15 may be employed. This section 15 may be secured at its lower end to the anchoring member 9, and is provided at its upper end with a flexible strip 16 secured to the upper portion of the back section 8. In the use of this additional back section 15 a wrinkle or pucker is formed, which permits free up and down movement of the back proper 4 without disturbing the lower connections of the members 4, 8, and 15.

When pressure on the seat 3 and back 4 is relieved, the spring strips move the seat 3 upwardly. As the lower end of the section 15 is connected to the anchoring member 9, and as the vertical lengths of the back 4 and section 15 are the same, the upward movement of the seat is guided directly upwardly, and the seat proper is always in a straight proper position when unoccupied.

The face portions of the seat 3 and back 4 are preferably covered by appropriate fabric in selected pattern, as at 17, though obviously these portions need not be covered for effective results, though they readily lend themselves to any covering desired for ornamentation or color schemes.

Of course the auxiliary seat, while described for use in connection with automobile seats, is designed for use in any and all connections where it may be of use, and that in such additional uses, or for automobile use, no restriction as to dimensions or material is intended or to be inferred from the above description or from the drawings illustrating the invention.

What is claimed as new is:—

1. An auxiliary seat including a seat and back, the back being extended and folded down on the face of the back proper and secured to form an inverted pocket, a back section secured to the back at the respective ends of the latter, the surface of the back section remote from the back being sufficiently smooth to avoid undue friction, the back section being extended below its connection with the lower edge of the back to provide an anchoring member, and an auxiliary back section overlying the first mentioned back section and having a relatively flexible connection with the latter to permit independent movement of the auxiliary back section with respect to the back of the auxiliary seat.

2. An auxiliary seat including a seat and back, the back being extended and folded down on the face of the back proper and secured to form an inverted pocket, a back section secured to the back at the respective ends of the latter, the surface of the back section remote from the back being sufficiently smooth to avoid undue friction, the back section being extended below its connection with the lower edge of the back to provide an anchoring member, and an auxiliary back section overlying the first mentioned back section and having a relatively flexible connection with the latter to permit independent movement of the auxiliary back section with respect to the back of the auxiliary seat, said auxiliary back section being flexibly secured to the upper end of the back and directly secured at the lower end to the anchoring member.

WELLINGTON I. CLEMENTS.